United States Patent
Bode

(10) Patent No.: US 12,005,867 B2
(45) Date of Patent: Jun. 11, 2024

(54) SYSTEM FOR A WIPER ARM AND A WIPER ARM

(71) Applicant: A. RAYMOND ET CIE, Grenoble (FR)

(72) Inventor: Karl Bode, Lörrach (DE)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 17/887,808

(22) Filed: Aug. 15, 2022

(65) Prior Publication Data
US 2023/0058667 A1 Feb. 23, 2023

(30) Foreign Application Priority Data

Aug. 18, 2021 (DE) .......................... 102021004211.5

(51) Int. Cl.
  *B60S 1/34* (2006.01)
  *B60S 1/04* (2006.01)
  (Continued)

(52) U.S. Cl.
  CPC .......... *B60S 1/3415* (2013.01); *B60S 1/4083* (2013.01); *B60S 1/4087* (2013.01); *B60S 1/0491* (2013.01); *B60S 1/522* (2013.01)

(58) Field of Classification Search
  CPC ...... B60S 1/4083; B60S 1/4087; B60S 1/522; B60S 1/3429; B60S 1/3405; B60S 2001/4027; B60S 1/0491; B60S 1/3415
  (Continued)

(56) References Cited

U.S. PATENT DOCUMENTS 2,861,290 A * 11/1958 Hoyler ...................... B60S 1/40
                                                     15/250.32
3,133,304 A * 5/1964 Reese ................... B60S 1/4083
                                                     15/250.32
(Continued)

FOREIGN PATENT DOCUMENTS

DE      1082818 B     6/1960
DE      1088375 B     9/1960
(Continued)

OTHER PUBLICATIONS

Machine assisted English translation of DE102016204243A1 obtained from https://patents.google.com/patent on Aug. 12, 2022, 6 pages.
(Continued)

*Primary Examiner* — Gary K. Graham
(74) *Attorney, Agent, or Firm* — Warner Norcross + Judd LLP

(57) ABSTRACT

A system for a wiper arm comprises an attachment which may be, for example, a nozzle bar, wherein the attachment comprises a snap-in means and a channel, wherein the system further comprises a wiper rod, wherein the wiper rod comprises a snap-in means which is complementary to the snap-in means of the attachment.
The system is configured such that the wiper rod can be inserted into the channel and then slid along the longitudinal axis of the channel in a direction (sliding direction) so far, until the snap-in means interlock, thereby preventing or limiting movement of the wiper rod within the channel and thus fixing the attachment to the wiper rod.

12 Claims, 2 Drawing Sheets

(51) Int. Cl.
*B60S 1/40* (2006.01)
*B60S 1/52* (2006.01)
(58) Field of Classification Search
USPC .................................................... 15/250.32
See application file for complete search history.

(56) References Cited

U.S. PATENT DOCUMENTS

| 2021/0001817 A1 | 1/2021 | Bratec et al. |
| 2022/0212632 A1 | 7/2022 | Haefner et al. |

FOREIGN PATENT DOCUMENTS

| DE | 102016204243 A1 | | 9/2017 |
| DE | 102017221310 A1 | | 5/2019 |
| DE | 102019110084 A1 | | 10/2020 |
| FR | 1218175 | * | 5/1960 |
| GB | 839277 | * | 6/1960 |
| WO | 2013170877 | * | 11/2013 |
| WO | 2020043264 | * | 3/2020 |
| WO | 2020264586 A1 | | 12/2020 |

OTHER PUBLICATIONS

Machine assisted English translation of DE1082818B obtained from https://patents.google.com/patent on Jan. 10, 2023, 3 pages.
Machine assisted English translation of DE1088375B obtained from https://patents.google.com/patent on Jan. 10, 2023, 3 pages.

* cited by examiner

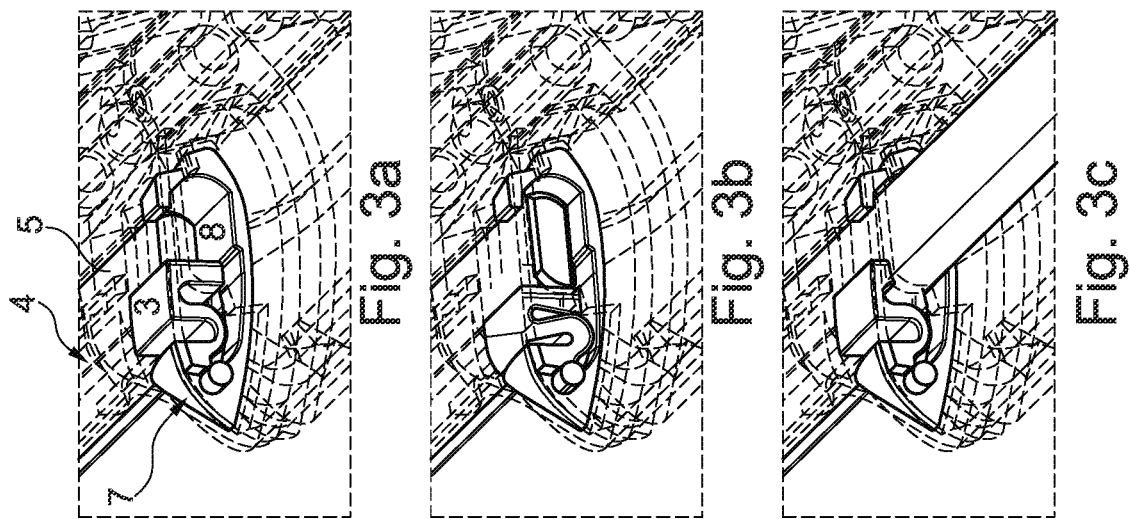
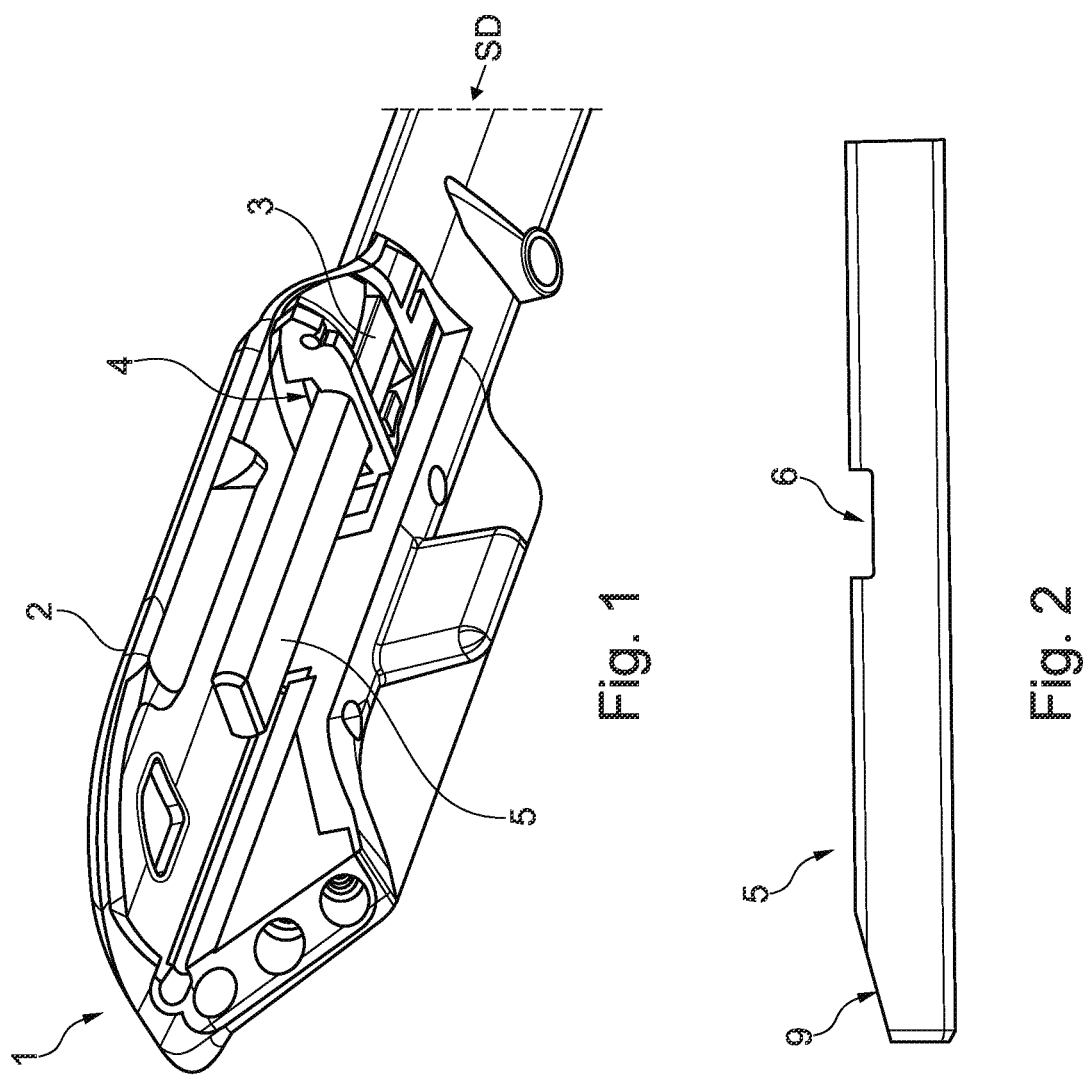

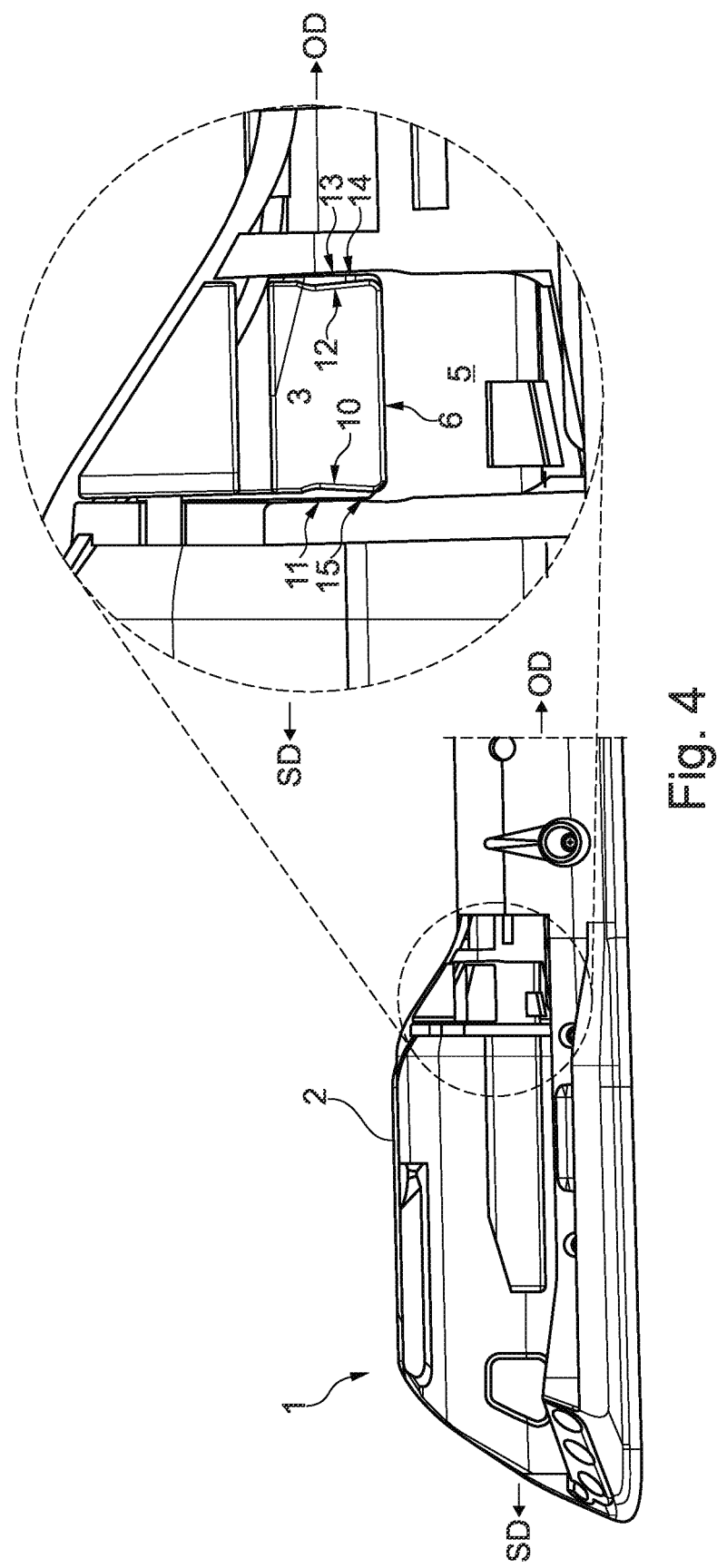

SYSTEM FOR A WIPER ARM AND A WIPER ARM

CROSS-REFERENCE TO RELATED APPLICATIONS

This application claims priority to and all advantages of German Patent Application No. 102021004211.5, filed on 18 Aug. 2021, the contents of which are hereby incorporated by reference.

FIELD OF THE INVENTION

The invention is generally directed to a system and, more specifically, to a system for a wiper arm and a wiper arm comprising the system.

BACKGROUND OF THE INVENTION

Systems for wiper arms are generally known in the art. Such system is disclosed in DE 10 2019 110 084 A1. For example, in FIG. 1a of this publication, a nozzle bar (as attachment) is referred to by the reference sign 1 and the wiper rod is referred to by the reference sign 3. In order to fix the nozzle bar to the wiper rod, the wiper rod is slid into a channel of the nozzle bar until the tip of the wiper rod reaches the snap-in means of the nozzle bar which is located within part 24 of the nozzle bar (see FIG. 3). The snap-in means 26 is arranged at a film hinge 27 which can be swivelled in order to push the snap-in means 26 into a recess 29, thereby enclosing the tip of the wiper rod 3 and consequently fixing the nozzle bar to the wiper rod.

This has the disadvantage that a person is responsible for controlling whether the wiper rod is slid into the correct position in which the tip of the wiper rod projects into the receptacle of part 24. Furthermore, an additional mounting act is required, namely swivelling the film hinge in order to interlock the snap-in means 26 and 29. This is further complicated by the circumstance that the mounting person can only check whether the wiper rod is in the correct position when he looks at the bottom side of the nozzle bar (see FIG. 2). From other perspectives, the look at the relevant region is blocked by the corpus of the nozzle bar.

Therefore, the present invention intends to improve the system according to DE 10 2019 110 084 A1 such that it allows an easier, quicker and more reliable connection between the attachment and the wiper rod.

BRIEF SUMMARY OF THE INVENTION

Disclosed is a system for a wiper arm. The system comprises an attachment, wherein the attachment comprises a snap-in means and a channel. The system further comprises a wiper rod, wherein the wiper rod comprises a snap-in means which is complementary to the snap-in means of the attachment. The system is configured such that the wiper rod can be inserted into the channel and then slid along the longitudinal axis of the channel in a direction so far, until the snap-in means interlock, thereby preventing or limiting movement of the wiper rod within the channel and thus fixing the attachment to the wiper rod.

The basic idea of the invention is to provide the attachment with a snap-in means and the wiper rod with a complementary snap-in means; these snap-in means interlock automatically when the wiper rod reaches the correct position within the attachment.

Thus, the system is configured such that the wiper rod can be inserted into the channel and then slid along the longitudinal axis of the channel in a direction (sliding direction) so far, unit the snap-in means interlock, thereby preventing or limiting movement of the wiper rod within the channel and thus fixing the attachment to the wiper rod.

The system according to the invention only needs one mounting act, namely sliding the wiper rod into the channel until the respective snap-in means interlock. Therein, the correct position of the wiper rod could not be failed. Therefore, it is not possible that the wiper arm is accidentally slid too deep into the channel, thereby causing collisions with other parts of the wiper arm.

The movement of the wiper rod in the sliding direction and/or in the direction opposite to the sliding direction (opposite direction) is prevented or limited. The term "preventing movement" means that the movement of the wiper rod is blocked in the sliding direction and/or in the opposite direction. The term "limiting movement" means that the wiper rod can move to a certain restricted extend in the sliding direction and/or opposite direction while the snap-in means are interlocked.

The channel extends longitudinally and therefore has a longitudinal axis. Preferably, the channel is straight. It is preferred that the cross section of the channel and the cross section of the wiper rod are configured such that a rotation of the wiper rod within the channel is prevented or limited. For example, this could be realized by polygonal, in particular rectangular, cross sections. Preferably, the channel is arranged completely or partially within the attachment.

Preferably, the wiper rod is a straight rod. In an exemplary embodiment, the wiper rod is part of a device which comprises further components like a spring box which is referred to by the reference sign 6 in FIG. 1a of DE 10 2019 110 084 A1. Therein, the spring box is connected at the end of the wiper rod which is not intended to be inserted into the channel of the nozzle bar.

Preferably, the attachment is a nozzle bar. A further example is a wind deflector or a combination of wind deflector and nozzle bar.

In a preferred embodiment, the snap-in means of the attachment is a spring element and the snap-in means of the rod arm is a recess. In the interlock state, the spring element engages the recess. Alternatively, the snap-in means of the wiper rod is a spring element and the snap-in means of the attachment is a recess. The spring element is preferably compressible. Alternatively, the spring element is not compressible.

In a preferred embodiment, the snap-in means of the attachment is arranged within the attachment in such a way that it is at least not completely visible from outside the attachment. In particular, it is hidden by the corpus of the attachment. Alternatively, from one perspective, the snap-in means of the attachment is visible through an opening of the attachment, whereas from at least one another perspective, the view to the snap-in means is blocked. For example, the snap-in means can be viewed from the bottom view but not from the left and right side view and the top view.

Due to simply sliding the wiper rod within the channel in order to achieve an interlock of the snap-in means, the system according to the invention allows the designer more freedom of design, so that he can also design such (partially) closed attachments. It is not necessary to guarantee that the snap-in means of the attachment is visible (from all sides). A quasi blind mounting is possible.

In a preferred embodiment, the spring element of the attachment protrudes into the channel, wherein the system is configured such that the wiper rod, while sliding within the channel in sliding direction, displaces the spring element, thereby causing a restoring force, until the spring element snaps into the recess, thereby establishing the interlock of the snap-in means. In particular, the wiper rod displaces the spring element such that the spring element is moved away from the longitudinal axis of the channel. In the case in which the spring element is compressible, the wiper rod also compresses the spring element.

In a preferred embodiment, the system comprises a receiving device with a receptacle, wherein the receptacle is part of the channel, wherein the receiving device comprises the spring element and the spring element protrudes into the receptacle. Preferably, the receptacle is a longitudinal section of the channel.

Alternatively, the receptacle is not part of the channel but aligned with the channel. This means that the wiper rod which is slid within the channel in sliding direction is also arranged within the receptacle when the wiper rod has been slid far enough in sliding direction. In one exemplary embodiment, the receiving device is axially distanced to the channel such that there is a free space between the end of the channel and the receiving device. Preferably, the cross section of the receptacle has the same shape and size as the cross section of the channel, when the spring element within the receptacle is (fictively) thought away.

In a preferred embodiment, the system is configured such that the interlock of the snap-in means is enforced, when the wiper rod is pressed in sliding direction and a movement of the wiper arm in this direction is blocked because a first part of the spring element abuts a first part of the attachment.

"The interlock of the snap-in means is enforced" means that, compared to embodiments without such configuration, a higher force is required to pull the wiper rod out of the interlock in sliding direction.

The enforcement is caused by the contact of the first part of the spring element and the first part of the attachment, as described with reference to specific embodiments below. In particular, pressing the wiper rod induces a contact force which could press the spring element more against the recess.

An action which actually intends to overcome the interlock, namely pressing the wiper rod in sliding direction, is cleverly turned into its opposite, namely enforcing the interlock.

In a preferred embodiment, the system is configured such that the interlock of the snap-in means is additionally enforced, when the wiper rod is pressed in sliding direction, thereby pressing a first part of the recess against a second part of the spring element.

Beside a first contact (spring element vs. attachment), this embodiment also exploits a second contact (spring element vs. recess of wiper arm) to induce a pressure on the spring element pushing it more against the recess in order to enforce the interlock additionally. Nota bene: This is done while the wiper rod is pressed in the same direction. From two different sides, forces are generated to bring the spring element and the recess more together.

In particular, the first part of the spring element is opposite the second part of the spring element. Further, it is advantageous to use a compressible spring element since compressing it leads to a further force enhancement.

In a preferred embodiment, the system is configured such that the interlock of the snap-in means is enforced, when the wiper rod is pressed in opposite direction and a movement of the wiper arm in this direction is blocked because the second part of the spring element abuts a second part of the attachment.

The description part with reference to the analogue embodiment in which the wiper rod is pressed in sliding direction is applied mutatis mutandis.

In a preferred embodiment, the system is configured such that the interlock of the snap-in means is additionally enforced, when the wiper rod is pressed in opposite direction, thereby pressing a second part of the recess against the first part of the spring element.

The description part with reference to the analogue embodiment in which the wiper rod is pressed in sliding direction is applied mutatis mutandis.

In a preferred embodiment, the first part of the spring element is an inclined surface, wherein the inclination is such that the width of the spring element increases as the distance of the spring element to the longitudinal axis decreases, wherein the width of the spring element is defined by an axis parallel to the longitudinal axis of the channel when the snap-in means are interlocked.

Additionally or alternatively, the second part of the spring element is an inclined surface, wherein the inclination is such that the width of the spring element increases as the distance of the spring element to the longitudinal axis decreases.

A force is caused by the contact of the inclined surface of the spring element with the respective part of the attachment or the recess of the wiper rod (contact force). The inclination could divide the contact force in force components acting in perpendicular directions. At least one force component is directed such that it presses the spring element more into the recess. Preferably, this force component has a line of action which is perpendicular to the longitudinal axis of the channel and in particular intersects the longitudinal axis.

In a preferred embodiment, the first part of the spring element is substantially parallel to the first part of the attachment.

Additionally or alternatively, the second part of the spring element is substantially parallel to the second part of the attachment.

Additionally or alternatively, the first part of the spring element is substantially parallel to the second part of the recess.

Additionally or alternatively, the second part of the spring element is substantially parallel to the first part of the recess.

In the context of the present description, the term "substantially parallel" means that the respective slopes are arranged to each other at an angle of −15 to 15, preferably 0 degree.

In a preferred embodiment, the wiper rod has a section at its end which is intended to be inserted into the channel or receptacle, wherein the section is configured such that it successively displaces and preferably compresses the spring element as the section progresses to pass over the spring element. Preferably, the section is a slope.

In a preferred embodiment, the receiving device or at least the spring element of the receiving device is made of a more elastic material than the portion of the attachment that does not comprise the receiving device.

This has the effect that each part (attachment and receiving device) is made of a material which fits better to its function: On the one hand, the spring element (as part of the receiving element) must be elastic in order to snap into the recess. On the other hand, it could be necessary that a nozzle bar (as attachment) must be rigid in order to guarantee an exact and non-displaceable orientation of the nozzles, for example.

Preferably, the complete receiving device is made of the same material. Alternatively, the spring element of the receiving device is made of a different material than the portion of the receiving device which does not comprise the spring element.

In a preferred embodiment, the system is configured such that the receiving device is mountable to the portion of the attachment that does not comprise the receiving device, preferably by a snap-in mechanism and preferably in a releasable manner.

This allows replacing the receiving device or using different receiving devices if required. A replacement might be necessary when the receiving device is impaired or damaged. Using different receiving devices might be required if the same type of attachment is used for wiper rods with (possibly slightly) different shapes. Then, a modified receiving device could be simply mounted to the attachment.

Alternatively, the attachment including the receiving device is made of one piece.

Preferably, the attachment is a two-component-part. Preferably, it is made of a hard component and a soft component. The hard component could be for example a PP Copolymer GF20. The soft component could be for example a TPE-V.

Preferably, the attachment could be made of POM, for example POM-C, -B, -I or -BK.

The invention also refers to a wiper arm which comprises a system according to the invention. Preferably, the wiper arm is for a vehicle, for example a motor vehicle like a passenger car. In particular, such wiper arm is a wiper arm of a windscreen wiper. Preferably, the wiper arm comprises other components like a wiper blade.

BRIEF DESCRIPTION OF THE DRAWINGS

Hereinafter, the invention is described with reference to the figures which show only exemplary embodiments of the invention.

FIG. 1 shows an exemplary system for a wiper arm;
FIG. 2 shows the wiper rod separately;
FIGS. 3a, 3b, and 3c show the mounting progression until the interlock is established; and
FIG. 4 shows an enlarged view of the interlock area.

DETAILED DESCRIPTION

As shown in FIG. 1, the system 1 for a wiper arm comprises an attachment 2 which is a nozzle bar. The attachment comprises a spring element 3 as a snap-in means and a channel 4.

The system further comprises a wiper rod 5. As shown in FIG. 2, the wiper rod 5 comprises a recess 6 as a snap-in means which is complementary to the spring element 3 of the attachment.

As shown in FIG. 1, the system 1 is configured such that the wiper rod 5 can be inserted into the channel 4 and then slid along the longitudinal axis of the channel in a direction—which is called sliding direction (reference sign: SD)—so far, unit the snap-in means interlock, thereby preventing or limiting movement of the wiper rod 5 within the channel 4 and thus fixing the attachment 2 to the wiper rod 5. The snap-in means interlock such that the spring element 3 snaps into the recess 6. This happens automatically, when the respective snap-in means are at the correct position. Therefore, it does not matter that the interlock area is only partially visible and only from certain views. The mounting person does not have to see the interlock area, when mounting the attachment 2 to the wiper rod 5. Additional mounting acts are not necessary.

As better shown in FIG. 3a, the system 1 comprises a receiving device 7 which comprises a receptacle 8. The receptacle 8 is part of the channel 4, wherein the receiving device 7 comprises the spring element 3 and the spring element 3 protrudes into the receptacle 8. The receptacle 8 is a longitudinal section of the channel 4. When the spring element 3 which is compressible is completely displaced out of the receptacle 8 by the wiper rod 5, the size and shape of cross section of the receptacle 8 is identical to the size and shape of the cross section of the other sections of the channel 4. In this embodiment, the receiving device 7 is mountable to the attachment 2 by a snap-in mechanism and in a releasable manner.

FIGS. 3a to 3b show the progression of inserting the wiper rod 5 into the receptacle 8, thereby successively displacing and compressing the spring element 3 until the spring element 3 finally snaps into the recess 6 (FIG. 3c). In order to support a successively and evenly displacing of the spring element 3, the wiper rod 5 has an inclined section 9 at its end which is intended to be inserted into the receptacle 8. This is better shown in FIG. 2.

FIG. 4 shows an enlarged view of the interlock. The system 1 is configured such that the interlock of the spring element 3 and the recess 6 is enforced, when the wiper rod 5 is pressed in sliding direction SD and a movement of the wiper arm 5 in this direction is blocked because a first part 10 of the spring element abuts a first part 11 of the attachment. These parts are inclined surfaces which are substantially parallel. The same applies mutatis mutandis to the second part 12 of the spring element and the second part 13 of the attachment, when the wiper rod 5 is pressed in opposite direction OD and a movement of the wiper arm 5 in this direction is blocked because the second part 12 of the spring element abuts the second part 13 of the attachment.

As further shown in FIG. 4, the system 1 is configured such that the interlock of the snap-in means is additionally enforced, when the wiper rod 5 is pressed in sliding direction SD, thereby pressing a first part 14 of the recess against the second part 12 of the spring element. These parts are inclined surfaces which are substantially parallel. The same applies mutatis mutandis to the second part 15 of the recess and the first part 10 of the spring element, when the wiper rod 5 is pressed in opposite direction OD, thereby pressing these parts against each other.

Therefore, the interlock is from both sides doubly secured, when the wiper rod 5 is pressed in sliding direction SD. Additionally, it is also from both sides doubly secured, when the wiper rod 5 is pressed in opposite direction OD.

LIST OF REFERENCE SIGNS

1 System for a wiper arm
2 Attachment
3 Spring element
4 Channel
5 Wiper rod
6 Recess
7 Receiving device
8 Receptacle
9 Section of wiper rod which is inclined
10 first part of the spring element
11 first part of the attachment
12 second part of the spring element 13 second part of the attachment
14 first part of the recess The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A system for a wiper arm, wherein the system comprises an attachment, wherein the attachment comprises a snap-in means and a channel, wherein the system further comprises a wiper rod, wherein the wiper rod comprises a snap-in means which is complementary to the snap-in means of the attachment, wherein the snap-in means of the attachment is a spring element and the snap-in means of the wiper rod is a recess, wherein the system is configured such that the wiper rod can be inserted into the channel and then slid along a longitudinal axis of the channel in a direction so far, until the spring element and the recess interlock, thereby preventing or limiting movement of the wiper rod within the channel and thus fixing the attachment to the wiper rod, wherein the system is configured such that the interlock of the spring element and the recess is enforced, when the wiper rod is pressed in an opposite direction, thereby pressing a second part of the recess against a first part of the spring element, wherein the first part of the spring element is an inclined surface, wherein an inclination of the inclined surface of the first part of the spring element is such that a width of the spring element increases as a distance of the spring element to a longitudinal axis decreases, wherein the width of the spring element is defined along an axis parallel to the longitudinal axis of the channel when the spring element and the recess are interlocked and/or wherein a second part of the spring element is an inclined surface, wherein an inclination of the inclined surface of the second part of the spring element is such that the width of the spring element increases as the distance of the spring element to the longitudinal axis decreases, wherein a force is caused by contact of the inclined surface of the first part of the spring element with the respective second part of the recess of the wiper rod, wherein the inclination of the inclined surface of the first part of the spring element divides the contact force in force components acting in perpendicular directions, wherein at least one force component is directed such that it presses the spring element more into the recess, wherein the first part of the spring element is substantially parallel to the second part of the recess.

2. The system according to claim 1, wherein the spring element is arranged within the attachment in such a way that it or its position is not visible from outside the attachment or only visible through an opening of the attachment, whereas the view to the spring element is blocked from different perspectives.

3. The system according to claim 1, wherein the spring element of the attachment protrudes into the channel, wherein the system is configured such that the wiper rod while sliding within the channel in a sliding direction displaces the spring element, thereby causing a restoring force, until the spring element snaps into the recess, thereby establishing the interlock of the spring element and the recess.

4. The system according to claim 1, wherein the system comprises a receiving device with a receptacle, wherein the receptacle is part of the channel or the receptacle is aligned with the channel, wherein the receiving device comprises the spring element and the spring element protrudes into the receptacle.

5. The system according to claim 4, wherein the receiving device or at least the spring element of the receiving device is made of a more elastic material than a portion of the attachment that does not comprise the receiving device.

6. The system according to claim 4, wherein the system is configured such that the receiving device is mountable to a portion of the attachment that does not comprise the receiving device.

7. The system according to claim 1, wherein the system is configured such that the interlock of the spring element and the recess is enforced, when the wiper rod is pressed in a sliding direction and a movement of the wiper rod in this direction is blocked because the first part of the spring element abuts a first part of the attachment.

8. The system according to claim 7, wherein the system is configured such that the interlock of the spring element and the recess is additionally enforced, when the wiper rod is pressed in sliding direction, thereby pressing a first part of the recess against the second part of the spring element.

9. The system according to claim 1, wherein the system is configured such that the interlock of the spring element and the recess is enforced, when the wiper rod is pressed in opposite direction and a movement of the wiper rod in this direction is blocked because the second part of the spring element abuts a second part of the attachment.

10. The system according to claim 1, wherein the wiper rod has a section at its end which is intended to be inserted into the channel or a receptacle, wherein the section is configured such that it successively displaces and preferably compresses the spring element as the section progresses to pass over the spring element.

11. A wiper arm comprising a system according to claim 1.

12. The system according to claim 1, wherein the attachment comprises a nozzle bar.

\* \* \* \* \*